US008115921B2

(12) United States Patent  (10) Patent No.: US 8,115,921 B2
Yoshida  (45) Date of Patent: Feb. 14, 2012

(54) PROBE FOR NEAR-FIELD LIGHT SCATTERING AND PROCESS FOR PRODUCTION THEREOF

(75) Inventor: Shigeki Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 688 days.

(21) Appl. No.: 12/252,725

(22) Filed: Oct. 16, 2008

(65) Prior Publication Data

US 2011/0170096 A1 Jul. 14, 2011

(30) Foreign Application Priority Data

Oct. 23, 2007 (JP) .................. 2007-275308

(51) Int. Cl.
*G01Q 60/18* (2010.01)
*G01Q 60/22* (2010.01)
*G01N 21/65* (2006.01)
(52) U.S. Cl. .............. 356/301; 850/30; 850/32
(58) Field of Classification Search .......... 356/301; 850/30–32
See application file for complete search history.

(56) References Cited

U.S. PATENT DOCUMENTS

| 7,050,247 | B2 | 5/2006 | Yoshida |
| 7,184,227 | B2 | 2/2007 | Yoshida |
| 7,241,987 | B2 * | 7/2007 | Saito et al. .................. 250/234 |

FOREIGN PATENT DOCUMENTS

| JP | 2005-91353 | 4/2005 |
| JP | 2005-164292 | 6/2005 |

OTHER PUBLICATIONS

Y. Inouye, et al., "Near-field scanning optical microscope with a metallic probe tip," Optical Letters, vol. 19, No. 3, (1994) pp. 159-161.
Yuika Saito, et al., "Fabrication of Silver Probes for Localized Plasmon Excitation in Near-field Raman Spectroscopy," Chemistry Letters, vol. 34, No. 7 (2005) pp. 920-921.

* cited by examiner

*Primary Examiner* — F. L. Evans
(74) *Attorney, Agent, or Firm* — Fitzpatrick, Cella, Harper & Scinto

(57) ABSTRACT

A probe for near-field light scattering, has, on the tip thereof, at least fine particles containing silver or silver oxide, a titanium oxide layer, and a silver layer at least in the named order from the surface thereof. A process for producing the probe for near-field light scattering comprises at least steps of forming a silver layer, a titanium oxide layer, and fine particles containing silver or silver oxide in the named order on the body of the probe. A near-field optical microscope or a Raman spectroscope, comprises the probe for the near-field light scattering; a control function for bringing the probe into contact with a surface of a test sample; an optical excitation system for producing an exciting light to or vicinity of the tip of the probe; and detecting optical system for detecting detection light emitted form the tip of the probe.

15 Claims, 4 Drawing Sheets

PROBE FOR NEAR-FIELD LIGHT SCATTERING AND PROCESS FOR PRODUCTION THEREOF

BACKGROUND OF THE INVENTION

1. Field of the Invention

The present invention relates to a probe for near-field light scattering, and to a process for producing the probe. More specifically, the present invention relates to a sharp-tipped probe which is used in near-field optical microscope and Raman spectrometer for detection of intensified scattered light, in which system the probe tip is brought into contact with an objective sample surface and simultaneously a light beam is projected onto the contact point. The present invention relates also to a process for producing the probe.

2. Description of the Related Art

In recent years, with progress in microfabrication of materials and in diversification of fabrication objects in various application fields, information analysis and measurement of microscopic spots are conducted for various materials and devices.

For inorganic materials, methods are developed for obtaining local information of the material with high reliability, the methods including use of an electron microscope. On the other hand, for soft materials such as those employed in molecular biology and organic devices, methods of non-destructive micro-analysis are not satisfactory. For example, an optical microscope is not capable of measurement in a size of the wavelength of a light beam or smaller. Infrared spectrometry and Raman spectrometry has also limitation in microanalysis from the same reason, and the signals obtained from a region of a size of wavelength order is weak and the signal intensity should be amplified.

For solving the above problems, in one method, a scattering type of probe is employed by utilizing positively the effect of electric field amplification by surface plasmon to exceed the limit of light diffraction. In another method, near-field light scattering is utilized with improved formation of a metal film on the probe (Japanese Patent Application Laid-Open No. 2005-164292). In a still another method, a Raman signal or a like signal from microscopic portion is optically detected by utilizing a surface amplification effect of a metal on a probe tip (Japanese Patent Application Laid-Open No. 2005-091353).

In still another method, for TERS (tip enhanced Raman spectroscopy) for obtaining local Raman spectral information, the probe tip is coated with silver by a silver mirror reaction.

SUMMARY OF THE INVENTION

The above-mentioned prior art techniques, particularly, formation of metal fine particles, have problems such that the amplification degree fluctuates owing to nonuniform diameters of the formed metal fine particles and that the amplified electric field range is broadened owing to coating of the entire tip of the probe with the metal fine particles. (The broadening of the amplified electric field range is undesirable in view of spatial resolution.)

The present invention has been made to solve the above problems, and intends to provide a probe which has metal fine particles on the probe tip and is useful for measurement with high reproducibility and high stability.

The present invention is directed to a probe for near-field light scattering; having, on the tip thereof, at least fine particles containing silver or silver oxide, a titanium oxide layer, and a silver layer at least in the named order from the surface thereof.

The tip of the probe can have fine particles containing silver or silver oxide, a separation layer, a titanium oxide layer, and a silver layer in the named order from the surface thereof.

The separation layer can be constituted of $SiO_x$ or $AlO_x$.

The tip of the probe can have fine particles containing silver or silver oxide, a titanium oxide layer, a silver layer, and a titanium oxide layer in the named order from the surface thereof.

The tip of the probe can have fine particles containing silver or silver oxide, a separation layer, a titanium oxide layer, a silver layer, a titanium oxide layer, and an adhesion layer in the named order from the surface thereof.

The fine particles containing silver or silver oxide can have respectively a diameter ranging from 5 nm to 20 nm.

The silver layer and the titanium oxide layer can have respectively a thickness ranging from 10 nm to 100 nm.

The present invention is directed to a process for producing a probe for near-field light scattering, the process comprising at least steps of forming a silver layer, a titanium oxide layer, and fine particles containing silver or silver oxide in the named order on the body of the probe.

The fine particles containing silver or silver oxide are formed by keeping the probe having the layers in a high humidity atmosphere.

The fine particles containing silver or silver oxide can be formed by applying an electric field to the tip of the probe having the layers formed thereon to give a negative potential to the tip relative to the sample.

The process can comprise further a step of forming a separation layer between the titanium oxide layer and the fine particles containing silver or silver oxide.

The process can comprise further a step of forming a titanium oxide layer between the main body of the probe and the silver layer.

The process further can comprise steps of forming an adhesion layer and a titanium oxide layer successively between the main body of the probe and the silver layer; and forming a separation layer between the titanium oxide layer and the fine particles containing silver or silver oxide.

The present invention is directed to a near-field optical microscope or a Raman spectroscope, comprising a probe for the above near-field light scattering; a control function for bringing the probe into contact with a surface of a test sample; an optical excitation system for producing an exciting light to or vicinity of the tip of the probe; and detecting optical system for detecting detection light emitted from the tip of the probe.

The present invention provides a probe which has an excellent single-particle film of silver uniform in the particle size and which gives an evaluation tool having improved quantitativeness and stability of measurement. The present invention improves the reproducibility of the probe production. Further, formation of the fine particles by application of an electric field enables deposition selectively on the probe tip and enables formation of a highly constricted intensified electric field for measurement with high spatial resolution.

Further features of the present invention will become apparent from the following description of exemplary embodiments with reference to the attached drawings.

DESCRIPTION OF THE EMBODIMENTS

The probe for near-field light scattering and the process for production thereof according to the present invention are described below in detail with reference to drawings.

Firstly the constitution of the probe for near-field light scattering (hereinafter referred to simply as a "near-field light scattering probe" occasionally) of the present invention is described.

Figure 1:
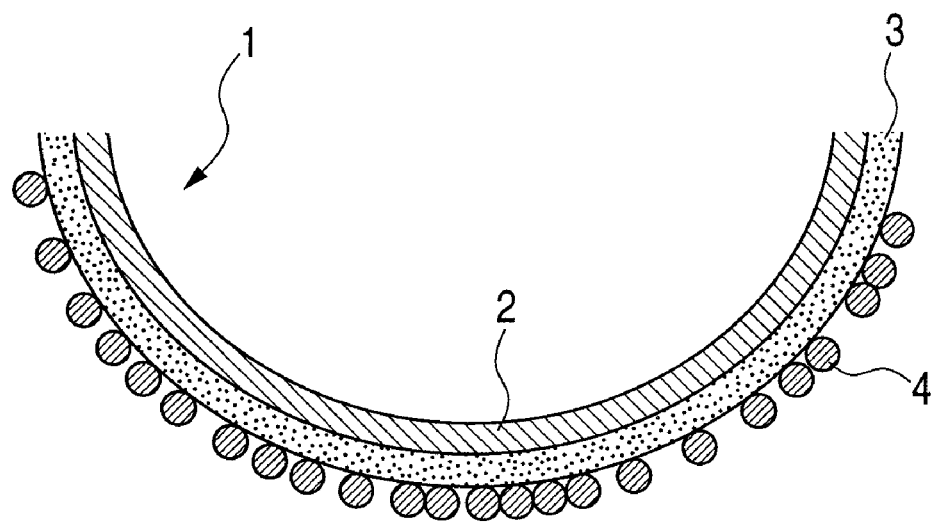
FIG. 1 is a schematic drawing of a probe for near-field light scattering of the present invention.

FIG. 1 illustrates schematically the tip of the probe of the embodiment of the present invention. In FIG. 1, the reference numerals denote the members as follows: 1, a probe body; 2, a silver layer; 3, a titanium oxide layer; 4, a fine particle containing silver or an oxide thereof.

The material of the probe body is not limited specially, but is preferably selected from semiconductors and metals in view of ease of working.

The probe has preferably a tip having a small curvature for analysis of a microscopic portion, specifically the curvature being not more than 100 nm. The probe tip has preferably a larger aspect ratio of the shape, having a sharp point, for projection a light beam onto the point of contact of the probe tip with the test object: typically in a shape of a circular cone or a pyramid. The probe may be in a shape of a bar, but the probe tip is preferably in an acute angle shape.

The fine particles containing silver or its oxide formed on the surface of the probe have a diameter ranging preferably from 5 nm to 20 nm, more preferably from about 10 nm to about 15 nm. Generally, the plasma frequency in the fine particles depends on the particle size. In the above particle diameter range, the plasma frequency corresponds to the electromagnetic wave of the visible light range to facilitate electric field amplification by resonance.

The silver layer and titanium oxide layer are formed on the surface of the probe respectively in a thickness ranging from 10 nm to 100 nm. In particular, for diffusion of silver from the silver layer, the thickness of the titanium layer is preferably not more than 50 nm. By forming the respective layers in the above-mentioned thickness ranges, the respective layers can be made as a continuous layer, and the probe tip can be made to have the curvature approximately in the above-mentioned curvature range.

Figure 2:
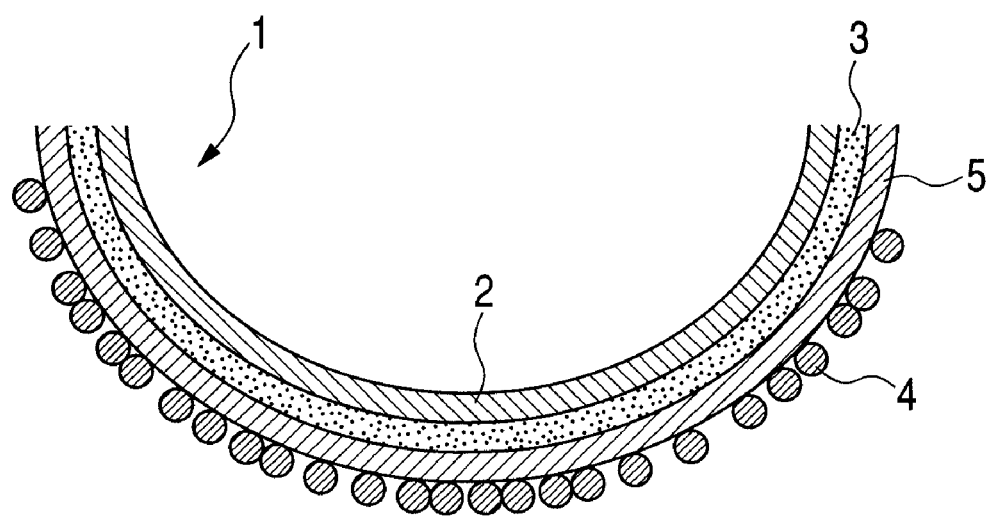
FIG. 2 is a schematic drawing of another probe for near-field light scattering of the present invention.

FIG. 2 illustrates another constitution of the probe different from the one illustrated in FIG. 1. This probe has separation layer 5 between titanium oxide layer 3 and fine particles 4 containing silver or its oxide. As described later, in the regeneration of the fine particles, the remaining fine particles are once removed (e.g., by Ar ion etching). In this removal step, separation layer 5 enables this removal of the fine particles removed selectively without damaging the underlying titanium oxide layer.

Separation layer 5 is constituted preferably of silicon oxide ($SiO_x$), or aluminum oxide ($AlO_x$). In comparison of the both material, the velocity of diffusion of silver from the silver layer to the surface is higher in the silicon oxide. Among the silicon oxides, SiO is particularly preferred for the silver diffusion. In contrast, in aluminum oxide, the velocity of silver diffusion is lower for formation of the fine particles, but the silver will not diffuse extremely quickly even in use under high humidity conditions not to cause excessive growth of the fine particles. Therefore, aluminum oxide is preferred for keeping the light-amplifying function under high humidity conditions for a long term.

Figure 3:
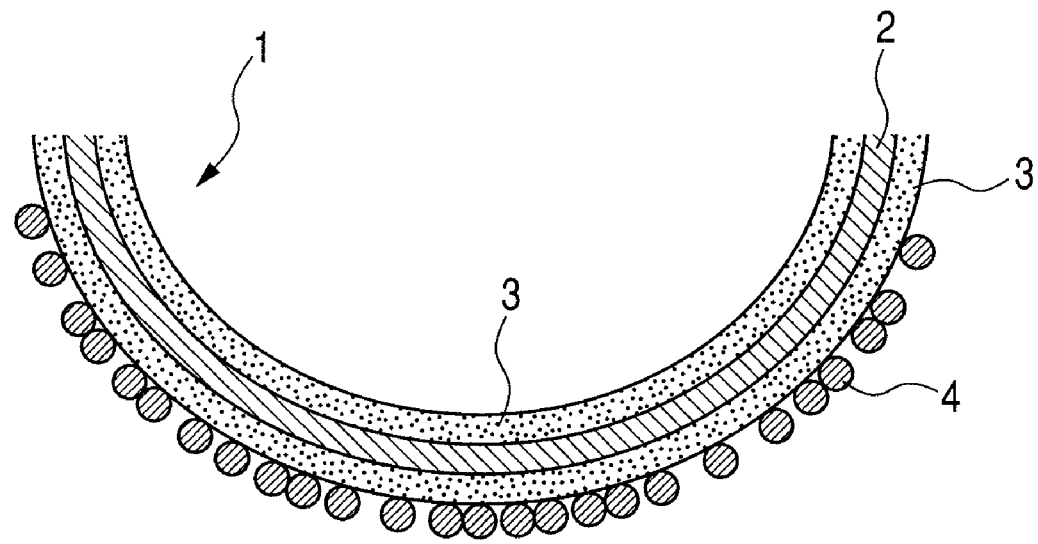
FIG. 3 is a schematic drawing of still another probe for near-field light scattering of the present invention.
Figure 4:
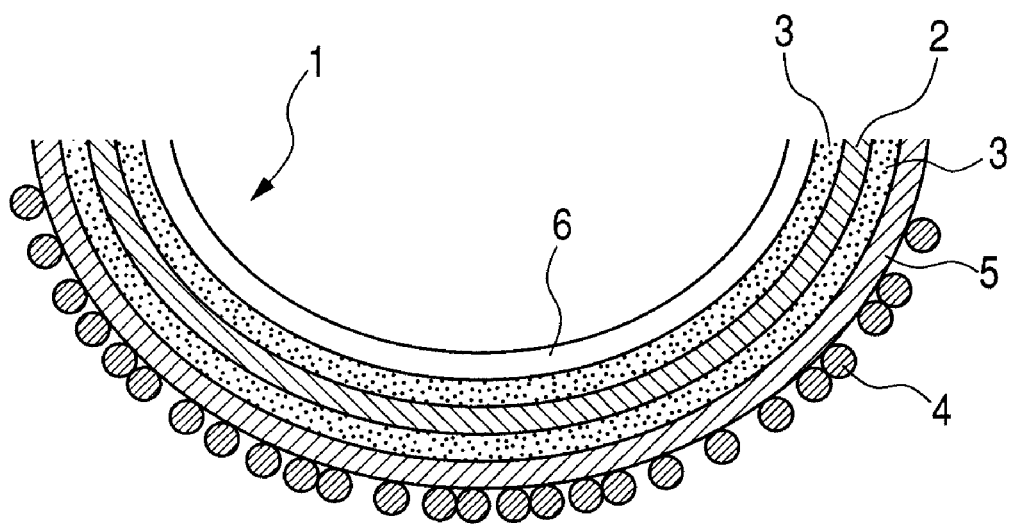
FIG. 4 is a schematic drawing of still another probe for near-field light scattering of the present invention.

FIG. 3 and FIG. 4 illustrate other constitutions, in which another layer is provided between probe body 1 and silver layer 2 in symmetry to the opposite-side layer. That is, the probe in FIG. 3 has a constitution of (fine particles containing silver or silver oxide)/(titanium oxide layer)/(silver layer)/(titanium oxide layer)/(probe body) in the named order from the outside. The probe illustrated in FIG. 4 has a constitution of (fine particles containing silver or silver oxide)/(separation layer)/(titanium oxide layer)/(silver layer)/(titanium oxide layer)/(adhesion layer)/(probe body) in the named order from the outside.

The titanium oxide layer 3 placed between probe body 1 and silver layer 2 as mentioned above prevents diffusion of silver to the probe body to strengthen the function of silver layer 2 as the silver reservoir. Further, adhesion layer 6 placed between titanium oxide layer 3 and probe body 1 as illustrated in FIG. 4 may be made of the same material as that of the separation layer. The adhesion layer improves the adhesion between probe body 1 and titanium oxide layer 3 when the probe body is formed from a material like a plastic.

Next, the process is described below for producing the probe for near-field light scattering.

In the process for producing the probe for near-field light scattering, the above-mentioned layers are formed successively on probe body 1 by a gas-phase film formation method. For example, silver layer 2 can be formed by resistance-heating vapor deposition, sputtering, or electron beam vapor deposition. Titanium oxide layer 3 can be formed preferably by sputtering. Separation layer 5 and adhesion layer 6 can be formed preferably by sputtering.

Next, formation of the fine particles containing silver or silver oxide on the probe surface is described below in detail. In the near-field light scattering probe of the present invention, on the tip of the probe, silver is allowed to diffuse from silver layer 2 through titanium oxide layer 3 to form dispersed fine particles 4 containing silver or silver oxide on the titanium oxide layer surface.

The diffusion of silver to form fine particles containing silver or silver oxide can be allowed to proceed by any of the following two methods: method-(A) in which the element is stored under high-humidity conditions, and method-(B) in which an electric field is applied to the element from outside.

In the above method-(A), for example, the probe having the titanium oxide layer and the silver layer formed on the probe body is left standing in a high-humidity atmosphere to allow formation of fine particles 4 containing silver or silver oxide. A higher temperature accelerates the formation of the fine particles: typically at a temperature of 60° C. and a humidity of 90%. In the above method-(B), for example, an electric field is applied to the probe having a titanium oxide layer and a silver layer formed on the probe body to keep the probe tip side to be negative to the objective sample side to allow formation of the fine particles on the probe surface. According to this method, the fine particles can be formed nearer to the probe tip owing to a higher electric field strength near the probe tip.

The fine particles formed in any of the above methods have particle diameters of several tens of nanometers with high uniformity. Therefore, in consideration of Raman spectrometry as measurement means, the absorption by plasmon excitation can be made greater and the amplification effect can be increased, whereby the data can be obtained with high reproducibility and high stability.

Next, a combination of AFM (atomic force microscope) and Raman scattering detector is described in which the near-field light scattering probe is employed.

Figure 5:
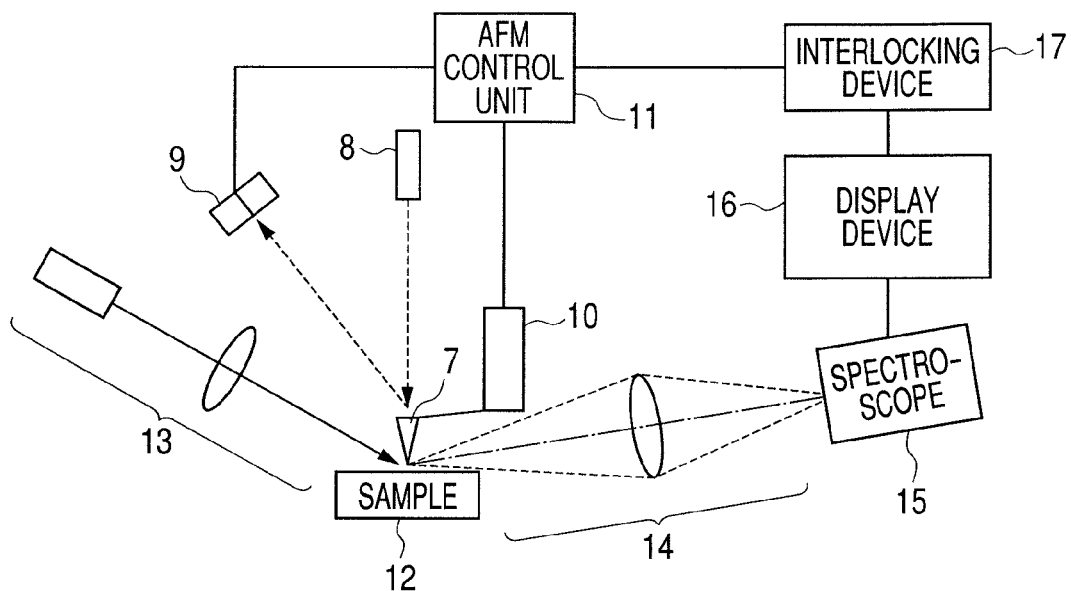
FIG. 5 is a schematic drawing of an example of a system of an atomic force microscope and a Raman scattering spectroscope employing a probe for near-field light scattering of the present invention.

FIG. 5 illustrates a constitution of a combination of an AFM with a Raman spectroscope. In this apparatus combination, probe (cantilever) 7 of the present invention is connected to scanner 10 for XYZ-direction scanning. A beam of laser 8 reflected by probe 7 is detected by two-divisional photosensor 9, and according to the signal from the photosensor, controller (AFM controller) 11 controls the contact pressure of probe 7 against the surface of test sample 12. On the other hand, exciting light beam is projected from Raman spectrometric exciting optical system (laser irradiation system) 13 onto the region of contact between the probe tip and test sample 12. The detection light is introduced through detecting optical system (Raman scattering detection optical system) 14, and light detection and spectrometry are conducted with detector and spectroscope 15. The spectrum is displayed by the Raman spectrometry controller and display device 16.

By use of interlocking device 17 for the AFM and the Raman spectroscope, Raman scattering signal can be detected in synchronization with AFM scanning (in synchronization with the positional information) to enable imaging.

The probe of the present invention can be applied to near-field optical microscopes.

EXAMPLES

The present invention is described below with reference to Examples without limiting the invention thereto in any way.

Example 1

In this Example, Raman scattering signal was detected by use of the near-field light scattering probe of the present invention: specifically, a probe made of Si for AMF as illustrated in FIG. 1.

Firstly, silver layer 2 was formed in a thickness of 20 nm by sputtering on the probe body 1 of Si probe for AFM. Then, on the silver layer, titanium oxide layer 3 was formed in a thickness of 20 nm by reactive sputtering.

This probe was left standing in an atmosphere of a temperature of 60° C. and a humidity of 90% for 30 hours. By inspection of the surface of titanium oxide layer 3 with Auger spectroscope, fine particles containing at least silver oxide were found to be formed on the surface. By observation of the surface with SEM, the formed fine particles were found to have diameters of about 10 nm and to be distributed at a density of about $10^9$ particles per mm$^2$.

With the above-obtained probe, Raman scattering from single carbon nanotube (CNT) on a Si wafer was detected as descried below. Incidentally, the CNT was dispersed with a solvent on the Si wafer. The CNT had a diameter of about 30-40 nm. The Raman scattering light from the probe was detected (see FIG. 5). The laser light had a wavelength of 532 nm.

Figure 6:
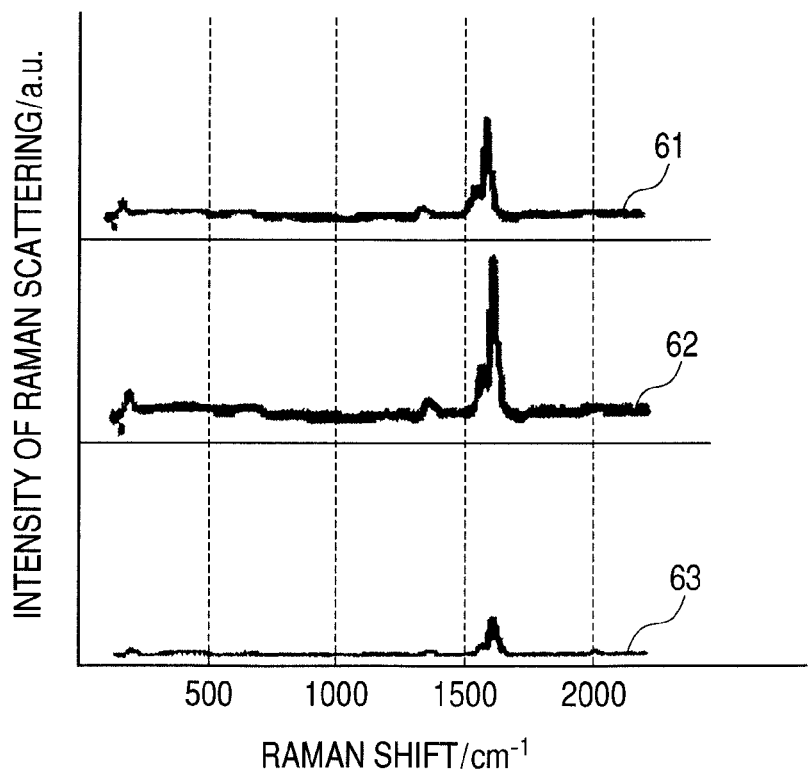
FIG. 6 is a graph showing a reproducibility of the measurement with a probe for near-field light scattering of the present invention.

In FIG. 6, curve 61 shows Raman scattering signal from a single CNT. By bringing close the probe to the CNT, the electric field was intensified, enabling detection of the Raman scattering signals at the region of 50 nm or less. Here, the peaks at 1590-cm$^{-1}$ and at lower wave number side belong to the G-band, the peak at 1350 cm$^{-1}$ belongs to the D-band caused by a defect, and those at 165.2 cm$^{-1}$, 170.8 cm$^{-1}$, and 192.6 cm$^{-1}$ belong to a radial breathing modes (RBM) reflecting the stretching of the diameter.

The same experiment was repeated twice. The results are shown in FIG. 6 by curves 62 and 63. In repeated experiments, a silver layer and a titanium oxide layer were formed on the probe tip, and the fine particles containing silver and silver oxide were allowed to form on the surface of the titanium oxide by keeping the probe at a high temperature and a high humidity. The Raman scattering from the single CNT was measured in the same manner as above. FIG. 6 shows the results of the three measurements including the result of the first measurement. As the results, the dispersion of the signal intensity was found to be within one digit or less.

As described above, the formation of metal fine particles on the tip of the probe decreases dispersion of the signal amplification degree. In this Example, the detection of the Raman-scattered light was conducted in a scattering mode, but may be conducted in a transmission mode. An AFM probe was used in this Embodiment, but a probe for STM (scanning tunnel microscope) may be used. The fine particles were allowed to deposit on the probe tip by storage at a high temperature and a high humidity in this Example, but may be deposited by application of an electric field as mentioned before.

As a comparative example, a silver layer was formed by vacuum vapor deposition on the tip portion of the a main body of an AFM probe, and analysis of the Raman scattering by a single CNT was repeated three times with the same system as in Example 1. As the results, the intensity of the Raman scattering is dispersed in two digits or more, the signal amplification being significantly being unstable.

Example 2

In the same manner as in Example 1, a titanium oxide layer (20 nm) was formed on the tip portion of the probe body. Separately, a silver layer (20 nm) was formed on a glass plate. The tip portion of the above probe was brought into contact vibratingly with the silver layer surface on the glass plate in a so-called tapping mode to cause decrease of the vibration amplitude by half of that in non-contact vibration before the probe-plate contact (output of the photosensor: RMS of about 3 V) for 5 minutes. Thereby a slight amount of silver came to be attached to the probe tip only. Onto the silver layer formed on the probe tip, a titanium oxide layer (20 nm) was further formed. Further, the probe was kept at a higher temperature and a high humidity in the same manner as in Example 1 to form fine particles containing silver and silver oxide on the titanium oxide layer surface at and near the probe tip end.

Figure 7:
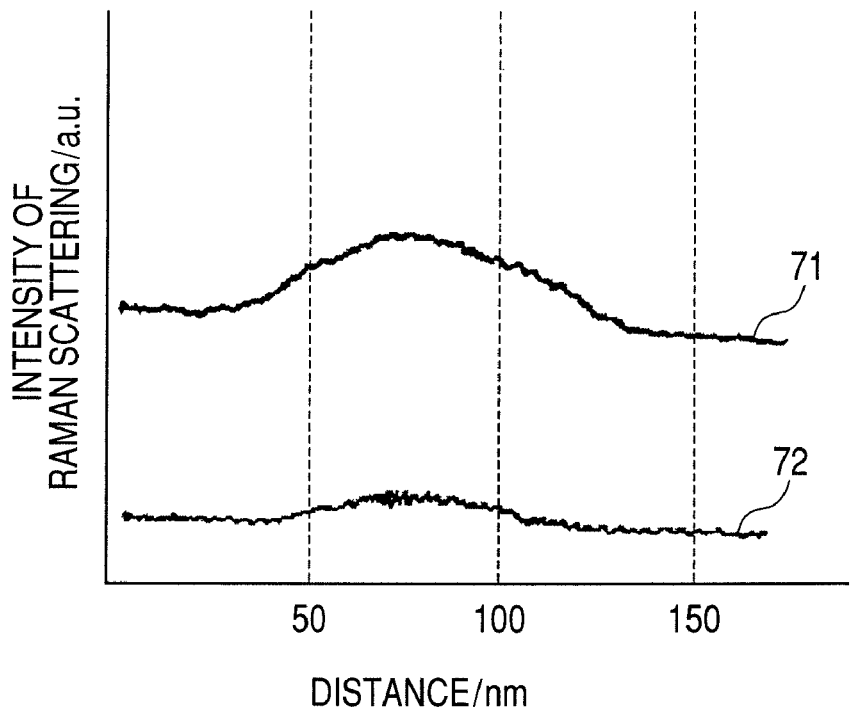
FIG. 7 is a graph showing spatial resolution of measurement with a probe for near-field light scattering of the present invention.

The above probe was employed for line analysis in the direction of the section of CNT used in Example 1. Specifically, the probe was vibrated by AC, and was brought into contact with the sample surface with vibration. The AFM was operated in a so-called tapping mode, and the Raman scattering was measured while scanning the profile of sectional height of CNF in a cross direction of length of the CNF. The G band (1590 cm$^{-1}$) of the Raman-scattered light was used in the measurement. FIG. 7 shows the results, in which curve 71 indicates the result with the probe of this Example, and curve 72 indicates the result with the probe of Example 1. With the probe of this Example, the diameter of the CNT was observed to be smaller. Thus, a probe having excellent spatial resolution can be produced by depositing the metal fine particles only at and near the probe tip. However, since the amount of the signal is smaller, the spatial resolution and the amount of the signal should be adjusted suitably for the respective objective samples.

For attaching silver on the tip only of the probe, LFM (lateral force microscope) may be employed by utilizing an AFM system; or the probe is allowed to scan a silver layer surface in a contact mode at a higher contact pressure; or a focus curve measurement may be employed by setting suitably the force in the repulsive force region.

In still another method, the silver fine particles can be formed only at and near the probe tip by forming a silver layer (20 nm) and a titanium oxide layer (20 nm) on the probe tip and by applying a bias voltage to keep the probe side negative to the sample side.

Example 3

In the same manner as in Example 1, an element was prepared which has a constitution of ($SiO_x$ layer (separation layer: 20 nm))/(titanium oxide layer (20 nm))/(silver layer (20 nm))/(a titanium oxide layer (20 nm))/($SiO_x$ layer (adhesion layer: 20 nm))/(probe body) in the named order from the outermost face (see FIG. 4). Incidentally, the $SiO_x$ layers were formed also by sputtering.

On the surface of $SiO_x$ layer at the probe tip, fine particles containing silver and silver oxide were formed in the same manner as in Example 1.

Generally, in the technical field relating to the present invention, the efficiency of the light amplification with the silver-coated probe tip will deteriorate gradually with lapse of time. This can be due to a change of the state of plasmon in the metal by formation of silver sulfide or a like phenomenon on the silver surface during standing in the air.

The same deterioration can occur with the probe of the present invention. However, the efficiency of light amplification by the probe can be restored as described below.

Figure 8:
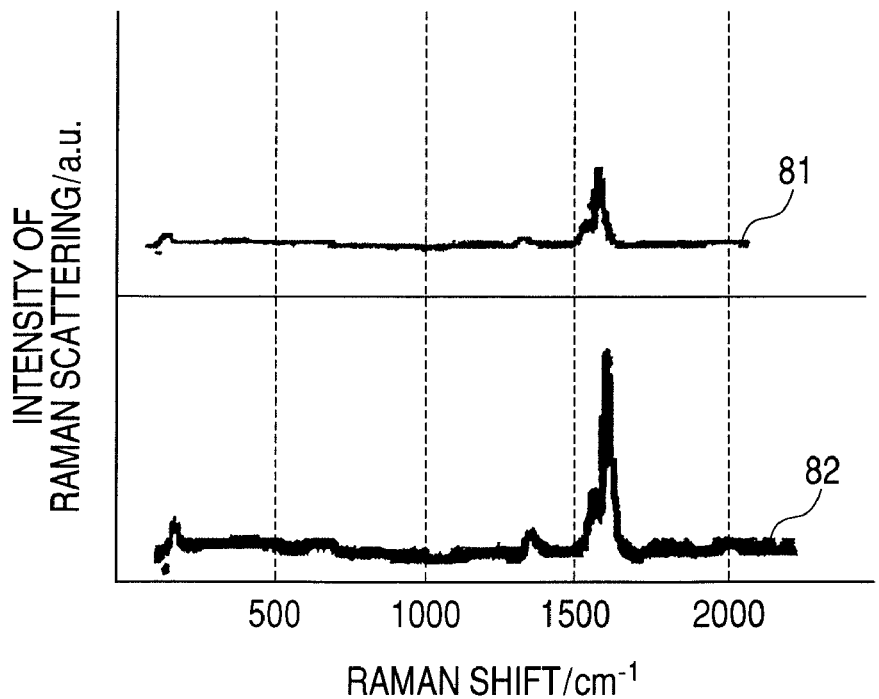
FIG. 8 is a graph showing restoration of function of a probe for near-field light scattering of the present invention.

In FIG. 8, curve 81 shows a signal from a single CNT with a probe having deteriorated amplification function. For restoration of the function, the tip of this probe was subjected to sputtering with Ar ions at 3 kev for 5 minutes, and kept at a high temperature and a high humidity again as mentioned above. Curve 82 in FIG. 8 shows the result of measurement of the Raman scattering signal with this probe, showing increase of the signal intensity. As described above, the amplification function of the probe can be restored by removing the silver sulfide formed at the probe tip and depositing again fine particles containing silver or silver oxide. Thereby the reproducibility of measurement can be maintained for a long term, not only simple restoration of the function.

Example 4

In the constitution of the probe in Example 3, the $SiO_x$ layer on the surface side was replaced by an $AlO_x$ layer (FIG. 4). This $AlO_x$ layer was formed by sputtering.

The fine particles on the probe surface were formed by leaving this element standing at a temperature of 60° C. at a humidity of 90% for 50 hours. The treatment time was longer than that with the $SiO_x$ layer because a longer time is necessary for the fine particle formation owing to a lower diffusion velocity of silver in the $AlO_x$ layer.

For ease of understanding of the effect of the $AlO_x$ layer the measurement with the probe having the $SiO_x$ layer of Example 3 is described firstly, before describing the results of measurement with this probe of the same CNT as in Example 1.

A probe having the same structure as in Example 3 employing a $SiO_x$ layer was used for measurement of a Raman scattering signal from the single CNT in a high humidity (humidity: 90%). The signal intensity was observed to decrease with lapse of time: decreased by two digits after 5 hours. The surface of this deteriorated probe was observed by SEM. As the result, no fine particle was found on the surface with SEM: the fine particles had grown and coalesced together to form in a network structure. Such a structure is considered to be formed by diffusion of silver from the silver layer to the surface owing to the high humidity, resulting in deterioration of the amplification efficiency.

In contrast, the probe of this Example has a constitution of ($AlO_x$ layer (separation layer: 20 nm))/(titanium oxide layer (20 nm))/(silver layer (20 nm))/(titanium oxide layer (20 nm))/($SiO_x$ layer (adhesion layer: 20 nm))/(probe body) in the named order from the surface. This constitution could keep the effect of amplification of the Raman scattering signal for a long time even at the high humidity conditions. This is due to the low velocity of diffusion of silver through the $AlO_x$ layer in comparison with that through the $SiO_x$ layer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-275308, filed Oct. 23, 2007, which is hereby incorporated by reference herein in its entirety.

What is claimed is:

1. A probe for near-field light scattering, comprising:
   a probe body,
   a silver layer;
   a titanium oxide layer; and
   fine particles containing silver or silver oxide,
   wherein the silver layer, titanium oxide layer and the fine particles are arranged in that order in a direction from the probe body to an outer surface of a tip of the probe.

2. The probe for near-field light scattering according to claim 1, further comprising a separation layer located between the titanium oxide layer and the fine particles.

3. The probe for near-field light scanning according to claim 2, wherein the separation layer is constituted of $SiO_x$ or $AlO_x$.

4. The probe for near-field light scattering according to claim 1, further comprising a second titanium oxide layer, located between the silver layer and the probe body.

5. The probe for near-field light scattering according to claim 4, further comprising an adhesion layer located between the second titanium oxide layer and the probe body.

6. The probe for near-field light scattering according to claim 1, wherein the fine particles containing silver or silver oxide has respectively a diameter ranging from 5 nm to 20 nm.

7. The probe for near-field light scattering according to claim 1, wherein the silver layer and the titanium oxide layer have respectively a thickness ranging from 10 nm to 100 nm.

8. A process for producing a probe for near-field light scattering, the process comprising at least steps of forming a silver layer, a titanium oxide layer, and fine particles containing silver or silver oxide in the named order on the body of the probe.

9. The process for producing a probe for near-field light scattering according to claim 8, wherein the fine particles containing silver or silver oxide are formed by keeping the probe having the layers in a high humidity atmosphere.

10. The process for producing a probe for near-field light scattering according to claim 8, wherein the fine particles containing silver or silver oxide are formed by applying an electric field to the tip of the probe having the layers formed thereon to give a negative potential to the tip relative to a sample.

11. The process for producing a probe for near-field light scattering according to claim 8, wherein the process further comprises a step of forming a separation layer between the titanium oxide layer and the fine particles containing silver or silver oxide.

12. The process for producing a probe for near-field light scattering according to claim 8, wherein the process further comprises a step of forming a titanium oxide layer between the main body of the probe and the silver layer.

13. The process for producing a probe for near-field light scattering according to claim 8, wherein the process further comprises steps of forming an adhesion layer and a titanium oxide layer successively between the main body of the probe and the silver layer; and forming a separation layer between the titanium oxide layer and the fine particles containing silver or silver oxide.

14. A near-field optical microscope or a Raman spectroscope, comprising a probe for the near-field light scattering according to claim 1; a control function for bringing the probe into contact with a surface of a test sample; an optical excitation system for producing an exciting light to or vicinity of the tip of the probe; and detecting optical system for detecting detection light emitted from the tip of the probe.

15. A probe for near-field light scattering, comprising:
a probe body,
a silver layer having a thickness ranging from 10 nm to 100 nm;
a titanium oxide layer having a thickness ranging from 10 nm to 100 nm; and
fine particles containing silver or silver oxide, having diameters in the range of 5 nm to 20 nm,
wherein the silver layer, titanium oxide layer and the fine particles are arranged in that order in a direction from the probe body to an outer surface of a tip of the probe.

* * * * *